United States Patent
Schoppe et al.

(10) Patent No.: US 10,896,192 B2
(45) Date of Patent: Jan. 19, 2021

(54) ALLOWING IN-LINE EDIT TO DATA TABLE OF LINKED DATA OF A DATA STORE

(71) Applicant: salesforce.com, inc., San Francisco, CA (US)

(72) Inventors: Owen Winne Schoppe, South San Francisco, CA (US); Ian Schoen, Oakland, CA (US); Jesse Hausler, Boulder, CO (US)

(73) Assignee: SALESFORCE.COM, INC., San Francisco, CA (US)

( * ) Notice: Subject to any disclaimer, the term of this patent is extended or adjusted under 35 U.S.C. 154(b) by 623 days.

(21) Appl. No.: 15/339,522

(22) Filed: Oct. 31, 2016

(65) Prior Publication Data

US 2018/0067976 A1   Mar. 8, 2018

Related U.S. Application Data

(60) Provisional application No. 62/385,151, filed on Sep. 8, 2016.

(51) Int. Cl.
*G06F 16/25* (2019.01)
*G06F 40/18* (2020.01)

(52) U.S. Cl.
CPC ............ *G06F 16/252* (2019.01); *G06F 40/18* (2020.01)

(58) Field of Classification Search
CPC ............................... G06F 16/252; G06F 40/18
USPC ........................................................ 707/805
See application file for complete search history.

(56) References Cited

U.S. PATENT DOCUMENTS

| | | | |
|---|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Alicia M Antoine
(74) *Attorney, Agent, or Firm* — Schwabe Williamson & Wyatt

(57) ABSTRACT

In an example, a database system may be configured to download to a user system an application configured to generate a data table from records stored in a data store, wherein the data table includes: a plurality of rows, wherein each row corresponds to at least one record of the records; and each row including a plurality of cells, each cell corresponding to a different grouping of data fields of its respective one(s) of the records; receive a communication from the application, the communication corresponding to at least one user input to a displayed cell of the data table; determine whether to feedback the at least one user input to the displayed cell of the data table to a corresponding data field of a corresponding record of the data store; and update the corresponding record in the data store based on a result of the determination.

21 Claims, 11 Drawing Sheets

(56) References Cited

U.S. PATENT DOCUMENTS

| | | | |
|---|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0044496 A1* | 2/2005 | Kotler .......... G06F 17/211 715/225 |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2011/0218958 A1 | 9/2011 | Warshaysky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0076642 A1* | 3/2013 | Rampson .............. G06F 3/0488 345/173 |
| 2013/0117714 A1* | 5/2013 | Rhee .................... G06F 17/245 715/823 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0108899 A1* | 4/2014 | Brissette ............. G06F 17/2235 715/205 |
| 2014/0359537 A1 | 12/2014 | Jackobson et al. |
| 2015/0142858 A1* | 5/2015 | Bryan ................... G06F 9/5088 707/809 |
| 2015/0193421 A1* | 7/2015 | Chitilian ................ G06F 40/18 715/217 |
| 2015/0324437 A1* | 11/2015 | Jiang .................... G06F 16/254 707/602 |
| 2016/0110425 A1* | 4/2016 | Ballantine ............ G06F 40/134 715/205 |
| 2017/0124050 A1* | 5/2017 | Campbell ........... G06F 3/04847 |
| 2017/0371926 A1* | 12/2017 | Shiran ............... G06F 16/24542 |

\* cited by examiner

FIGURE 3A

LEADS
My Leads ▼

5 items – Sorted by Name

[New Lead] [Import Leads]

| NAME | COMPANY | ADDRESS | EMAIL | PHONE | STATUS | RATING | ACTIONS |
|---|---|---|---|---|---|---|---|
| Carole White | Global Media | 12 W Oak, Biggs, CA 98300 United... | cwhite@globalmedia.com | (800) 234 - 1234 | Contacted | Junk Yield | ▶ |
| Edward Stamos | Acme | 222 W 238th St. Bronx, NY 91273... | edward@acme.com | (800) 494 - 4994 | New | Premium Yield | ▶ |
| John Gardner | 3C Systems | 4511 W Burnside, Portland OR 9... | jgardner@3csystems.com | (415) 938 - 2949 | Qualified | Junk Yield | ▶ |
| Sarah Loehr | MedLife, Inc. | 2300 Deer Run Ct. Los Altos, CA... | loehr@medlife.com | (503) 734 - 9483 | Contacted | Junk Yield | ▶ |
| Jim Steele | BigLife Inc. | 700 Parkway Blvd lake View, CA... | jim@biglife.com | (800) 775 - 2339 | Contacted | Premium Yield | ▶ |

LEADS
My Leads ▼

5 items – Sorted by Name

[New Lead] [Import Leads]

| NAME | COMPANY | ADDRESS | EMAIL | PHONE | STATUS | RATING | ACTIONS |
|---|---|---|---|---|---|---|---|
| Carole White | Global Media | 12 W Oak, Biggs, CA 98300 United... | cwhite@globalmedia.com | (800) 234 - 1234 | Contacted | Junk Yield | ▶ |
| Edward Stamos | Acme | 222 W 238th St. Bronx, NY 91273... | edward@acme.com | (800) 494 - 4994 | New | Premium Yield | ▶ |
| John Gardner | 3C Systems | 4511 W Burnside, Portland OR 9... | jgardner@3csystems.com | (415) 938 - 2949 | Qualified | Junk Yield | ▶ |
| Sarah Loehr | MedLife, Inc. | 2300 Deer Run Ct. Los Altos, CA... | loehr@medlife.com | (503) 734 - 9483 | Contacted | Junk Yield | ▶ |
| Jim Steele | BigLife Inc. | 700 Parkway Blvd lake View, CA... | jim@biglife.com | (800) 775 - 2339 | Contacted | Premium Yield | ▶ |

|  | ADDRESS | EMAIL |
|---:|---|---|
| edited | 12 W Oak, Biggs, CA 98300 United... | cwhite@globalmedia.com |
| errored | 222 W 238th St. Bronx, NY 91273... | edward@acme.com |
| active cell | 4511 W Burnside, Portland OR 9... ✎ | jgardner@3csystems.com |
| hovered cell | 2300 Deer Run Ct. Los Altos, CA.... ✎ | loehr@medlife.com |
| selected row | 700 Parkway Blvd lake View, CA... | jim@biglife.com |
| default | 1344 SE Ryan Ct. Salem OR 973... | asmith@ut.com |

| locked | (718) 549 - 3888 🔒 |
|---|---|

FIGURE 6A

|  | ADDRESS | EMAIL |
|---:|---|---|
| edited | 12 W Oak, Biggs, CA 98300 United... | cwhite@globalmedia.com |
| errored | 222 W 238th St. Bronx, NY 91273... | edward@acme.com |
| active cell | 4511 W Burnside, Portland OR 9... ✎ | jgardner@3csystems.com |
| hovered cell | 2300 Deer Run Ct. Los Altos, CA.... ✎ | loehr@medlife.com |
| selected row | 700 Parkway Blvd lake View, CA... | jim@biglife.com |
| default | 1344 SE Ryan Ct. Salem OR 973... | asmith@ut.com |

FIGURE 6B

| | NAME | COMPANY | ADDRESS | EMAIL | PHONE | STATUS | RATING | ACTIONS |
|---|---|---|---|---|---|---|---|---|
| ☐ | Carole White | Global Media | 12 W Oak, Biggs, CA 96300 United... | cwhite@globalmedia.com | (800) 234 - 1234 | Contacted | Junk Yield | ▸ |
| ☐ | Edward Stamos | Acme | 222 W 238th St. Bronx, NY 91273... | edward@acme.com ✎ | (800) 494 - 4994 | New | Premium Yield | ▸ |
| ☐ | John Gardner | 3C Systems | 4511 W Burnside, Portland OR 9... | jgardner@3csystems.com | (415) 938 - 2949 | Qualified | Junk Yield | ▸ |
| ☐ | Sarah Loehr | MedLife, inc. | 2300 Deer Run Ct. Los Altos, CA.... | loehr@medlife.com | (503) 734 - 9483 | Contacted | Junk Yield | ▸ |
| ☐ | Jim Steele | BigLife Inc. | 700 Parkway Blvd lake View, CA... | jim@biglife.com | (800) 775 - 2339 | Contacted | Premium Yield | ▸ |

| | NAME | COMPANY | ADDRESS | EMAIL | PHONE | STATUS | RATING | ACTIONS |
|---|---|---|---|---|---|---|---|---|
| ☐ | Carole White | Global Media | 12 W Oak, Biggs, CA 96300 United... | cwhite@globalmedia.com | (800) 234 - 1234 | Contacted | Junk Yield | ▸ |
| ☐ | Edward Stamos | Acme | 222 W 238th St. Bronx, NY 91273... | edward@acme.com ✎ | (800) 494 - 4994 | New | Premium Yield | ▸ |
| ☐ | John Gardner | 3C Systems | 4511 W Burnside, Portland OR 9... | jgardner@3csystems.com | (415) 938 - 2949 | Qualified | Junk Yield | ▸ |
| ☐ | Sarah Loehr | MedLife, inc. | 2300 Deer Run Ct. Los Altos, CA.... | loehr@medlife.com | (503) 734 - 9483 | Contacted | Junk Yield | ▸ |
| ☐ | Jim Steele | BigLife Inc. | 700 Parkway Blvd lake View, CA... | jim@biglife.com | (800) 775 - 2339 | Contacted | Premium Yield | ▸ |

| LEADS My Leads ▼ | | | | New Lead | Import Leads ▶ |
|---|---|---|---|---|---|
| 5 items - Sorted by Name | | | Press return to enter grid. Press escape to exit. ✕ | | |

| | NAME | COMPANY | ADDRESS | EMAIL | PHONE | STATUS | RATING | ACTIONS |
|---|---|---|---|---|---|---|---|---|
| ☐ | Carole White | Global Media | 12 W Oak, Biggs, CA 98300 United... | cwhite@globalmedia.com | (800) 234 - 1234 | Contacted | Junk Yield | ▶ |
| ☐ | Edward Stamos | Acme | 222 W 238th St. Bronx, NY 91273... | edward@acme.com | (800) 494 - 4994 | New | Premium Yield | ▶ |
| ☐ | John Gardner | 3C Systems | 4511 W Burnside, Portland OR 9... | jgardner@3csystems.com | (415) 938 - 2949 | Qualified | Junk Yield | ▶ |
| ☐ | Sarah Loehr | MedLife, Inc. | 2300 Deer Run Ct. Los Altos, CA... | loehr@medlife.com | (503) 734 - 9463 | Contacted | Junk Yield | ▶ |
| ☐ | Jim Steele | BigLife Inc. | 700 Parkway Blvd lake View, CA. | jim@biglife.com | (800) 775 - 2339 | Contacted | Premium Yield | ▶ |

*FIGURE 9*

LEADS
My Leads ▼

5 items - Sorted by Name

| NAME | COMPANY | ADDRESS | EMAIL | PHONE | STATUS | RATING | ACTIONS |
|---|---|---|---|---|---|---|---|
| Carole White | Global Media | 12 W Oak, Biggs, CA 98300 United... | cwhite@globalmedia.com | (800) 234 - 1234 | Contacted | Junk Yield | |
| Edward Stamos | Acme | 222 W 238th St Bronx, NY 91273... | edward@acme.com | (800) 494 - 4994 | New | Premium Yield | |
| John Gardner | 3C Systems | 4511 W Burnside, Portland OR 9... | jgardner@3csystems.com | (415) 938 - 2949 | Qualified | Junk Yield | |
| Sarah Loehr | MedLife, Inc. | 2300 Deer Run Ct. Los Altos, CA... | loehr@medlife.com | (503) 734 - 9483 | Contacted | Junk Yield | |
| Jim Steele | BigLife Inc. | 700 Parkway | | (800) 775 - 2339 | Contacted | Premium Yield | |

We encountered 1 error while trying to sa...
• Carole White has a Address error.

[Cancel] [Confirm]

*FIGURE 10A*

* State
CA
* Country
United
Country must be "United States"

[Cancel] [Confirm]

*FIGURE 10B*

| | PHONE |
|---|---|
| | (800) 234 - |
| | (800) 494 - |
| | (415) 938 - |
| | (503) 734 - |
| | (800) 775 - |

| COMPANY | ADDRESS |
|---|---|
| Bob's Burgers | 222 W 238th St. |

*FIGURE 11*

| COMPANY | ADDRESS |
| --- | --- |
| Global Media | 101 Mission St. |
| Acme | 222 W 238th St. |

*FIGURE 12A*

| COMPANY ⬇ | ADDRESS |
| --- | --- |
| Global Media | 101 Mission St. |
| Acme | 222 W 238th St. |

*FIGURE 12B*

| COMPANY | ADDRESS |
| --- | --- |
| Global Media | 101 Mission St. |
| Acme | 222 W 238th St. |

*FIGURE 12C*

ALLOWING IN-LINE EDIT TO DATA TABLE OF LINKED DATA OF A DATA STORE

CROSS-REFERENCE TO RELATED APPLICATION

This application claims benefit of U.S. application Ser. No. 62/385,151, filed Sep. 8, 2016, which is incorporated herein by reference in its entirety

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to databases, and some embodiments related to systems and methods for allowing in-line edit to data table of linked data of a data store.

DESCRIPTION OF THE RELATED ART

A spreadsheet originated as a computerized simulation of paper accounting worksheets. Some modern spreadsheets are interactive computer applications for organization, analysis, and storage of data in tabular form. Each cell may contain user-entered data (e.g., numeric or text data) and/or a result of a formula that automatically calculate and display a value based on the contents of other cells. A spreadsheet user interface may allow a user to edit data for a cell, for instance to edit the user-entered data.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 3A-B illustrate a display table that may be generated for the user system in FIG. 2 for allowing in-line edit to a data table of linked data of a data store.

FIGS. 4A-B illustrates a display table that may be generated for the user system in FIG. 2 for providing an embedded input experience with edit popovers.

FIGS. 5 and 6A-B illustrate a display table that may be generated for the user system in FIG. 2 for indicating cell boundaries and improve row readability.

FIGS. 7-9 illustrate display tables that may be generated for the user system in FIG. 2 for indicating the current cell in a table and differentiating focus.

FIGS. 10A-B illustrates a display table that may be generated for the user system in FIG. 2 for navigating user to multiple errors in table.

FIG. 11 illustrates a display table that may be generated for the user system in FIG. 2 for associating a popover with a table cell and displaying input fields.

FIGS. 12A-C illustrates a display table that may be generated for the user system in FIG. 2 for allowing users to resize columns on a web table using a keyboard.

DETAILED DESCRIPTION

Figure 1A:
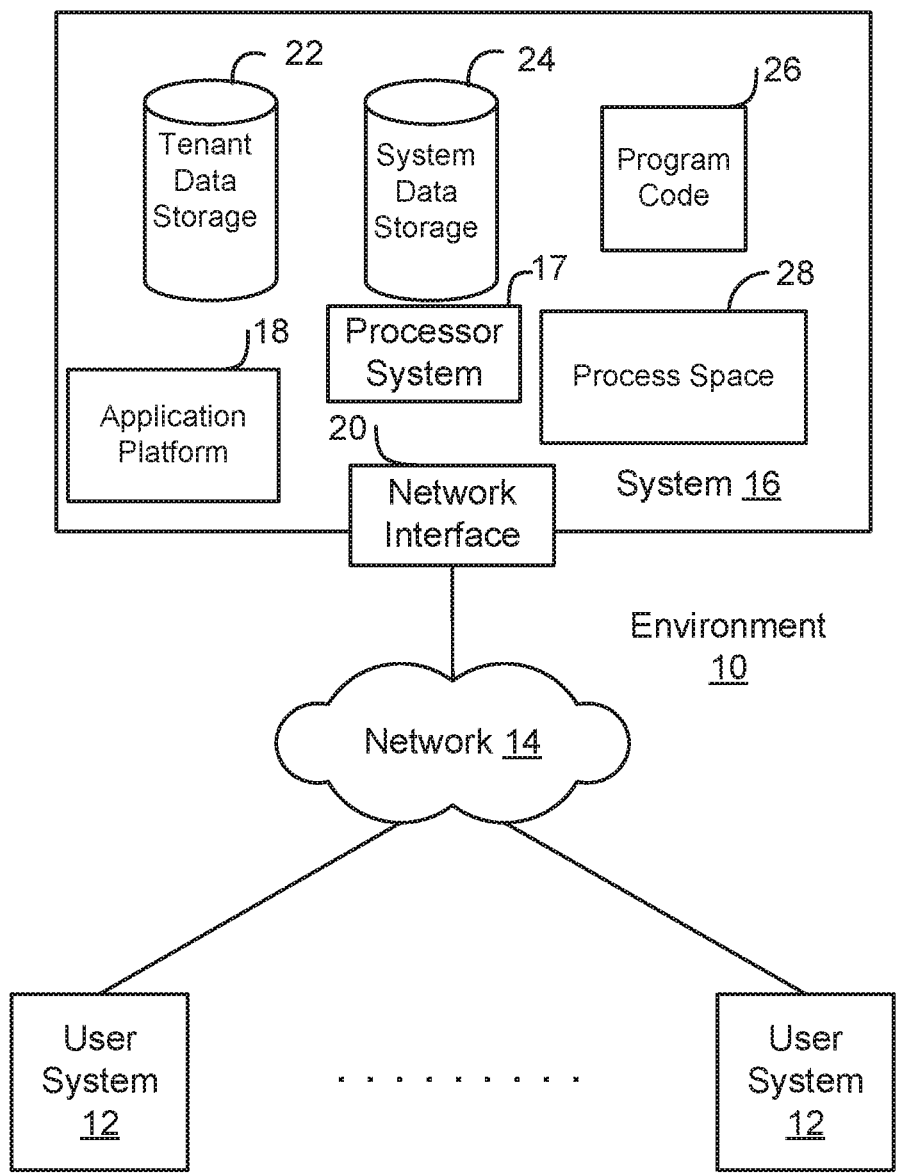
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated, that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for allowing in-line edit to a data table of linked data of a data store.

In an example, a database system may be configured to download to a user system an application configured to generate a data table from records stored in a data store, wherein the data table includes: a plurality of rows, wherein each row corresponds to at least one record of the records; and each row including a plurality of cells, each cell corresponding to a different grouping of data fields of its respective one(s) of the records; receive a communication from the application, the communication corresponding to at least one user input to a displayed cell of the data table; determine whether to feedback the at least one user input to the displayed cell of the data table to a corresponding data field of a corresponding record of the data store; and update the corresponding record in the data store based on a result of the determination.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MIS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chronic, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MIS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
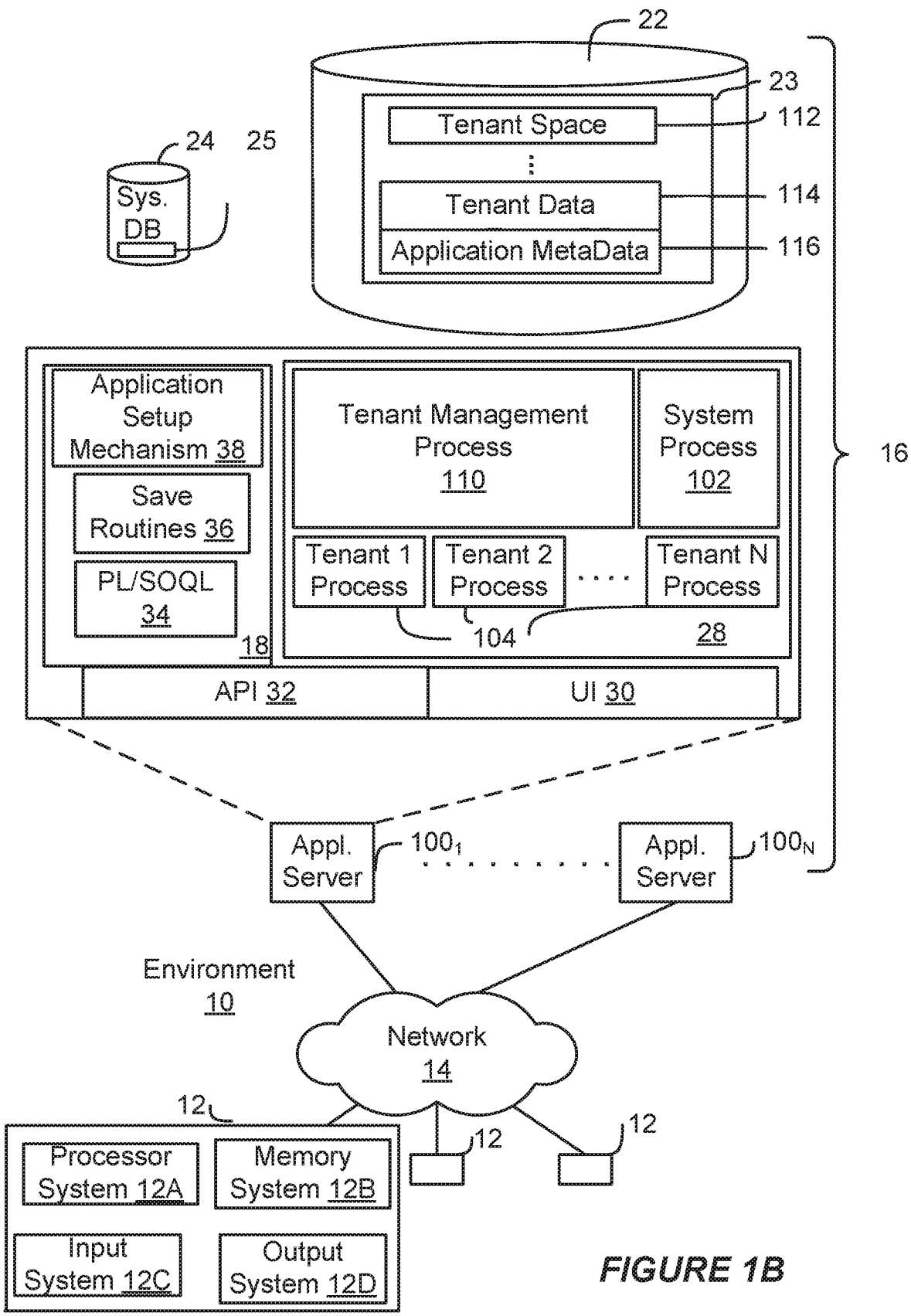
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MIS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. In-Line Edit to Data Table of Linked Day of Data Store

Unlike known spreadsheets where the data of a cell is based on a manual input or contents of other cells of the electronic document, a data table (e.g., a web based data table) may have at least one cell that is driven by one or more fields of records of a database. In some examples, the database includes a tenant database, and the data table may be driven by one or more first rules that are tenant specific (and which may include, for instance, validation rules created and/or customized by the tenant) and one or more second rules that are not tenant specific (e.g., global rules).

Some examples herein provide a system and method to allow in-line edit to a data table of linked data of a data store, e.g., data displayed in a data table cell is linked to one or more fields of database record(s). The new data of the in-line edit of the cell may be fed back to the relevant field(s) of the record(s) of the database. In some examples, a single cell may be driven by more than one field of at least one record of the database (in some examples this may be referred to as a concatenated cell, and in some embodiments the concatenated cells may be editable to change values of corresponding fields of the database). Also, a concatenated cell may include data of more than one field type. A cell for a contact may include a name and a link to a contact record. In some cases, the in-line edit of the field may involve a subsequent update to a plurality of fields of at least one record of the database.

To illustrate multiple field types, a concatenated cell may have a name of an entity, a title (such as Dr.), and a physical address. While a spreadsheet may have three columns, the data table disclosed herein may include a concatenated cell with linked data corresponding to all three field types of the record.

In some examples, the feedback to the relevant field(s) of the record(s) may be at a later time (for instance edits of more than one cell may be temporality aggregated and then feedback at a same time in response to a confirmation). For instance, the time for the feedback may be at a time a user selects a save command, an exit command, or the like, or combinations thereof.

A row of the data table may correspond to one record. The row has multiple cells, and each cell may represent one or more fields of the record.

Figure 2:
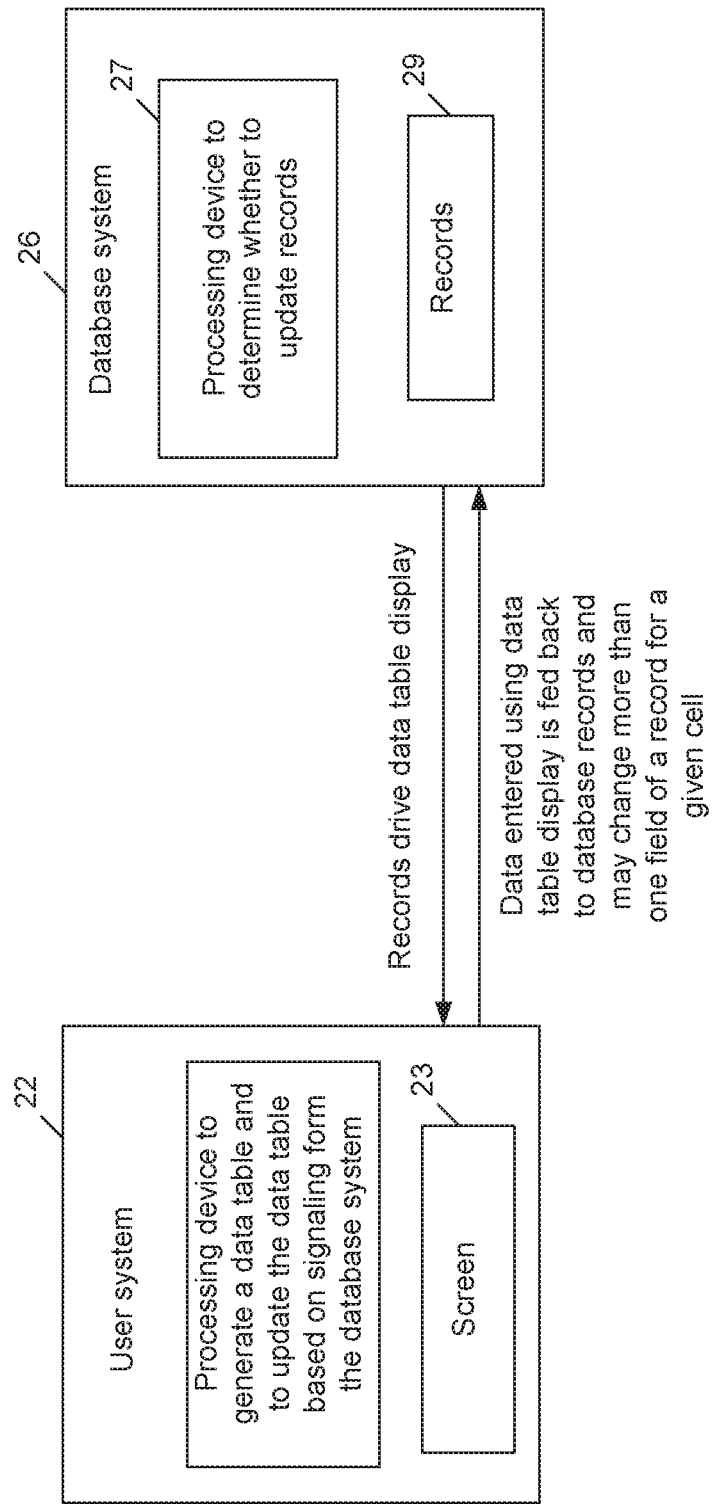
FIG. 2 illustrates a system for allowing in-line edit to a data table of linked data of a data store.

FIG. 2 illustrates a system for allowing in-line edit to a data table of linked data of a data store. The database system 26 of FIG. 2 may correspond to the database system 16 (FIG. 1A), and the user system 22 may correspond to the user system 12 (FIG. 1A).

The user system 22 may include a screen 23, and content displayed on the user system 22 may be driven by a processing device 27 of an application server of the database system 26 (application servers were described previously, e.g., $100_{1-N}$ of FIG. 1B). The content may be based on records 29 of a data store of the database system 26. Some of the operations described herein may be by the processing device 27 of the application server, and other operations described herein may be performed by a processor (not shown) of the user system 22.

The user system 22 may include a web browser, and the content may be displayed in this web browser. In some examples the web browser may include known web browsers, in some examples. In some examples, the standard web browsers may download to the user system 22 (e.g., from the application server of the database system 26) an application, e.g., an in-browser JavaScript application. The standard web browser may execute the application, which may run in the web browser. The application may generate the data table based on information of the database. The application may receive user inputs to the data table, and once requested (for instance via user selection of a save command), the application may send the accumulated user inputs to the database system 26 (e.g., the application server).

The database system 26 may validate the user inputs to determine whether to update the records 29, or not. If the records are not updated, the database system 26 may signal the application to display error messaging. The application may generate an updated displayed based on the signals from the database system 26.

FIGS. 3A-B illustrate a display table that may be generated for the user system 22 in FIG. 2 for allowing in-line edit to data table of linked data of a data store. It is noted that FIGS. 3, 4, 5, 6 and 11 are related to editing flow.

In some known tables, links are either not editable or there is a special affordance, outside the cell (e.g., solely outside the cell), for navigating to the link or editing the value. In some examples, the display table includes two interactive buttons/links 201 and 202 within the table cell to allow both actions. Clicking the link 201 navigates. Clicking the edit button 202 edits. Double clicking the space around the link 201 also edits. FIG. 3A illustrates a state of the display table responsive to a click of the link 201, while FIG. 3B illustrate different state of the display table responsive to click the edit button 202 and/or double clicking the space around the link 201 (in FIG. 3B, the edit button 202 appears differently than in FIG. 3A). This allows for a more accessible and easily understood interface. This is in contrast to other examples where a link is displayed entirely outside a cell, for instance in a drop down below the cell for displaying a link.

In some examples, the displaying of two interactive buttons/links 201 and 202 within the table cell involved a change in how arrow key navigation works on the grid. Rather than moving from cell to cell are key navigation may move from button to button, stopping multiple times in a single cell as necessary. For example, in the display table pressing the right arrow key navigates intra-cell from focusing on the link 201 to focusing on the button 202. Pressing return with button 202 in focus allows a user to edit values associated with the link (for instance to edit a typographical error in the name and/or to edit the link).

In some examples, cells that are both editable and navigable have two navigation targets: the link and the edit trigger. Pressing tab or right arrow moves the focus from the link to the edit trigger. Pressing arrow up/down while on the edit trigger moves the focus to the edit trigger in the cell above/below the current cell (not to the link in the next cell).

Figures 4A, 4B, 5:
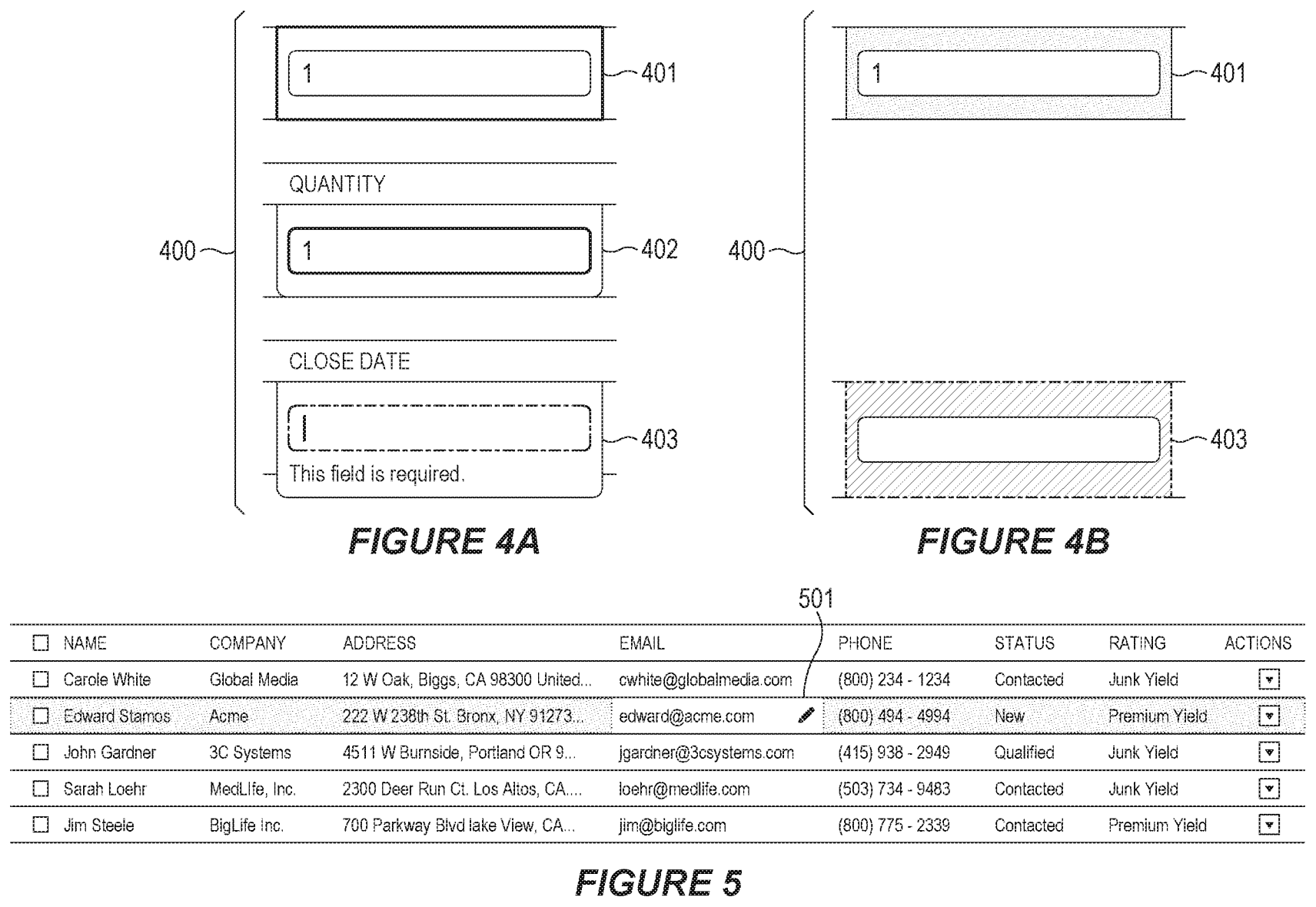

FIGS. 4A-B illustrate a display table that may be generated for the user system in FIG. 2 for providing an embedded input experience with edit popovers.

While some known tables allow inline editing by placing inputs in each cell, such an approach may not scale to all the types of data involved with certain data stores, e.g., some multi-tenant databases. For example, a picklist and dependent picklist cannot both fit in the cell.

To provide the same experience as embedded inputs, some embodiments utilize a pseudo-input. In some examples, the pseudo-input is a user control (e.g., a button), that is styled to look like the input but causes the edit popover to appear when clicked or tabbed onto. This may provide the same efficiency and scale to all the types of data involved with certain data stores, e.g., may provide a solution for the use of rich CRM (customer relationship management) data like richtext editors and dependent picklists. The user control (e.g., button) may be different than some user controls (e.g., not a standard button) for at least the reason that the user control may be activated on focus and clicking.

By changing the edit trigger to appear to be an input, a popover can be used. The user experience may be an in-line cell edit (even though the user is actually interacting with the popover). FIG. 4A illustrates cells that are in focus in different possible states (cell 401 normal with pseudo input, cell 402 with the edit overlay panel displayed, and cell 403 with the edit overlay panel displayed with error messaging displayed). FIG. 4B illustrates the same cell 401 not in focus in the state normal with pseudo input without an error indication, and the same cell 403 not in focus in the state normal with pseudo input with an error indication.

In some examples, rather than an edit icon button, pseudo inputs may use a text button to trigger edit. It may use the field value as it's text, and may have the appearance of an input (some examples may utilize a new left aligned style). This may be used only for certain data types in an example, e.g., simply data types such as text, date, picklists, email, phone, or the like. This may be used by the product selector. The cell may also have a special click handler to trigger the edit popover even if the user clicks inside the cell and outside of the button. The styling of the input and the button may be kept in sync. Input vertical alignment may be kept in sync by using the rendered cell height as the min-height in the panel. The panel may expand to a new dimension to show errors.

In the figures, including FIG. 4A, a dot dashed line represents a differently colored line than the solid lines. For instance, in an example the solid lines are black and the dot dashed lines may be a color different than black, such as red. In the figures, including FIG. 4B, a grey scale background indicates a background, such as a non-white background. In the figures, including FIG. 4B, cross hatching indicates a highlight background, such as a yellow background.

FIG. 5 illustrates a display table 500 that may be generated for the user system 22 in FIG. 2 for indicating cell boundaries and improve row readability.

This scheme highlights both the cell and the row allowing improved grouping of information within the cell and readability across the row. Other approaches may not highlight and/or may use a border on the cell or background highlight the Whole row. By using a negative highlight on the cell it provides a new approach to visually highlighting both the row and the cell. It also allowed for a more accessible set of cell and row states with a minimum number of variables.

Also, the double thick border allows for row highlighting on TVs and projectors where the contrast is too high and the tinted colors are lost.

The selected cell in display table is shown with a white background, and cell 501. The rows may receive a different background (e.g., non-white background such as a tinted background) and a double thick border. The selected row may correspond to one record. The row has multiple cells, and each cell may represent one or more fields of the record.

The vertical dividers between cells are hidden to amplify the record based nature of the data table. One hover (or some other programmed selection mechanism), the top and bottom borders are made thicker and a background (e.g., a light grey background or other non-white background) is displayed. However, the selected cell (e.g., the cell that is clicked) may be displayed differently, e.g., may not include the light grey background or other non-white background.

Full cell/row states to show style interactions are shown in FIGS. 6A-B. In some examples, cell states and/or row include at least one of grid focused and unfocused, row cell and target hover states, active highlight, cell and target focus, row selected, cell edited, cell errored, or locked cell. FIG. 6A cells n these different states when the grid has focus, and FIG. 6B shows these same cells in these different states when the grid does not have focus.

Using some of the techniques described above, a cell highlight/selection can be displayed without making all cell borders visible. Displaying only cell borders that correspond to row borders may reinforce to a user the association of rows to records, which is an association not present in some known spreadsheets that display entire cell borders.

FIGS. 7-9 illustrate, respectively, display tables that may be generated for the user system 22 in FIG. 2 for indicating the current cell in a table and differentiating focus.

Some spreadsheet like experiences may have the concept of a "current cell" or the active cell in the grid. Some embodiments using the data tables described herein may utilize a current cell feature. However, some embodiments may include a data table in which users may navigate around by use of the tab key. In these embodiments, a display table may indicate what the current cell is (where focus will go when entering the table) while differentiating what is actually currently focused by the user.

Some known spreadsheets always highlights the current cell (e.g., highlight in blue) and, in some cases, may not let focus leave the table. However, such an approach may not meet accessibility requirements associated with database systems including a multi-tenant database.

1. Current cell when focus is in the table:
   element in the table that has focus has it is focus state (button halo).
   cell has blue border inset inside the row dividers. This is illustrated in display table of FIG. 7, with cell 701 in a first state.
2. Current cell when focus is elsewhere:
   button/icon is still visible.
   background color is set.
   when tabbing into the table, focus is passes to this cell. This is illustrated in the display table of FIG. 8, with the same cell 701 in a second different state.

When tabbing to the table, the table is a single tab stop where users can choose to enter the grid or skip past it.
   the table gets a transparent white matte and an inset blue border indicating that it's selected.
   message provides instructions.
   tabbing away reveals state 2. Pressing enter and going into the table reveals state 1. This is illustrated in the display table of FIG. 9.

FIGS. 10A-B illustrates a display table that may be generated for the user system 22 in FIG. 2 for navigating user to multiple errors in table.

Given that the table may be driven by a tenant database, there may be first tenant specific validation rules and second other rules that may be applied to an input on a save. As stated before, one save may correspond to edits involving more than once cell. The display scheme described with respect to FIGS. 10A-B (and elsewhere herein) may be applied in examples where the first and second validation rules are applied to user inputs at a time that is disassociated with the user input (e.g., at a time of a save or other command that may aggregate inputs to more than one cell). For example, an administrator of a tenant may make a validation rule that country must be equal to United States, if their business is only within the United States (the example of FIGS. 10A-B corresponds to such an example). However, this is not a global rule, e.g., it is tenant-specific.

The validation using the first and second rules may cause an error associated with an input and/or cell that is no longer on the page (a user may have scrolled down the page after the input, but before the save command).

FIGS. 10A-B show a more than one level messaging system (e.g., a four level messaging system) provides a breadcrumb trail to allow users to navigate to errors on a table regardless of scale both horizontally and vertically. When inline editing errors can occur anywhere. User can edit multiple cells and scroll those edited cells out of view before clicking save. When clicking save the edited cells may not be visible. This method provides a means for user to locate and fix their errors. This system also enables the admin defined validation to be properly displayed on a table.

A highest level error message 1001 may be on a page footer, which is shown regardless of a state of the page may be visible in all states of the page (e.g., may always be visible). Next level errors may be visible depending on a state of the page. A first next level error 1002 may be displayed for a row. A second next level error 1003 may be displayed for a cell of the row. Referring to FIG. 10B, which shows the same display table in a different state (with a popover), a third next level error 1004 may be displayed on a portion of the text of the popover of the cell of the row. In some embodiments, an error defined as a field error may trickle down and display on all higher levels.

Also, previously herein popovers were discussed and it was noted that they may be top left aligned but may extend down vertically over other cells. The popover in FIG. 10 shows such an example (in the magnification it can be seen that the popover extends down over other rows).

In some examples, three kinds of errors can occur. These can be caused by validation rules, triggers, and gacks. In an example, global errors may include timeout, conflicts, and other service side issues. In an example, page (e.g., record) level errors may be defined by the admin in the validation rules and triggers. In an example, field level errors may be defined by the admin in validation rules and triggers.

In some examples, a four level messaging system is used in response to a server-side validation error to insure that users can locate and resolve all errors. Summary and global errors may be messaged at a footer button with tooltip/panel in the save-cancel bar. Page level errors and row summary may be messaged in a row error icon on every applicable row (an entirely new column may be inserted to hold this icon). Field error summary may be indicated by a cell error highlight on the cell where there is a field level error (button assistance text may be updated). A field error may be messaged within the popover form, which may follow standard form error specifications.

FIG. 11 illustrates a display table that may be generated for the user system 22 in FIG. 2 for associating a popover with a table cell and displaying input fields.

This scheme may allow the edit popovers used for inline editing a table to be visually associated with the correct table cell. Referring to FIG. 11:
   The top two corners are squared off and aligned to the top of the row. It creates a visual effect of extending out of the table like a pull tab.
   The top left or top right corner (depending on where the edge of the window is) is aligned to the top left or right corner of the cell, respectively. This keeps the data is the most approximate position to it's original position before the popover opened.
   The lower edge and opposing side extend beyond the table cell boundaries. The lower two corners are rounded. A slight dropshadow is applied. These three styles cause the popover to be disassociated from the surrounding table cells.

The popover is the squared cornered box. The box with rounded corners may be the text box that a user types into to edit a value. The popover may be top-left aligned and may cover part of a different cell depending on an amount of text in the text box. Referring back to FIG. 4, there is illustrated, for a popover, the before (normal with pseudo input) and after (quantity).

FIGS. 12A-C illustrates a display table that may be generated for the user system 22 in FIG. 2 for allowing users to resize columns on a web table using a keyboard.

Other tables allow users to resize columns by accessing a keyboard shortcut, editing a numerical input in a modal, or using their mouse only. This method allows convenient, direct access to the resize control using just the keyboard.
   Default header cell is as indicated in FIG. 12A.
   Referring now to FIG. 12B, table header cell active state for the same display table is shown:
      Table header cells are included within the table's arrowable cells, so users can arrow directly to header cells.
      Users can arrow side to side to switch header
      If the column is sortable; focus is placed on the sort button. Pressing return sorts the column.
      The resize control is visually indicated on the right.
      Pressing tab focuses the resize control.
   Referring now to FIG. 12C, a resized column for the same display table is shown:

Pressing the arrow keys resizes the column in increments of 10 px (pixel).

The resize control is actually a label, e.g., styled label, for an <input type="range"> (e.g., an HTML input type="range" element, e.g., HTML 5 input type="range" element). This allows the min, max, and increment to be set by the input type. The control also reads correctly for users using a screenreader. Furthermore it allows easier data binding using modern js frameworks.

Figure 13A:
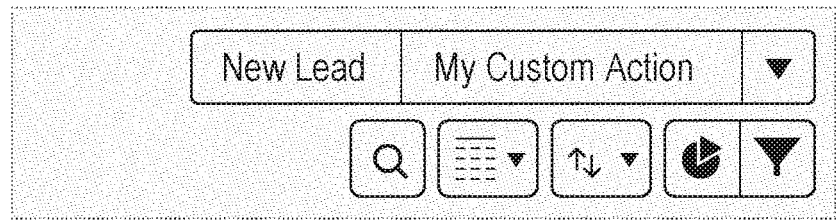
FIGS. 13A-C illustrates a display table that may be generated for the user system in FIG. 2 for indicating more actions are available.
Figure 13B:
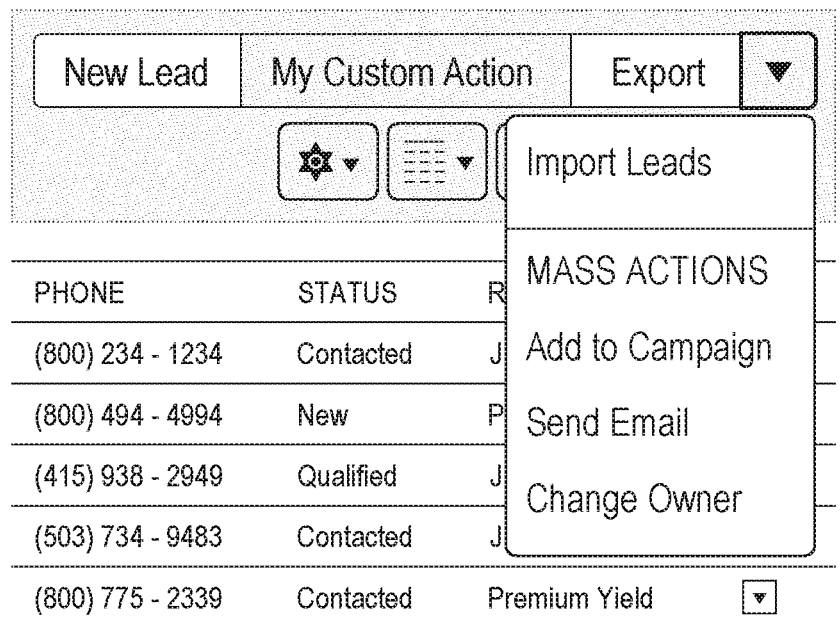
Figure 13C:
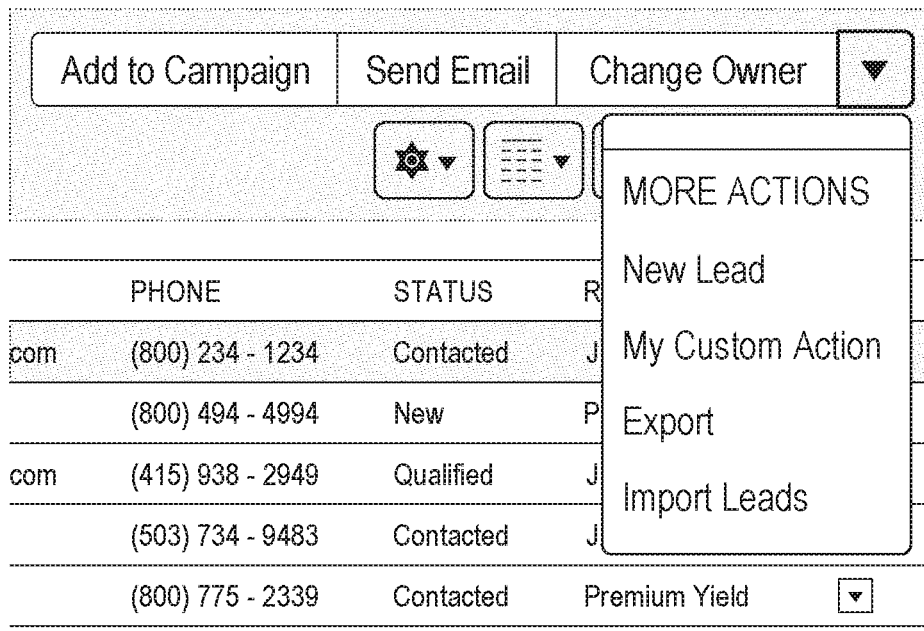

FIGS. 13A-C illustrates a display tables that may be generated for the user system 22 in FIG. 2 for indicating more actions are available.

This visual animation helps users discover that a different set of actions are available after they select a row on the page. It utilizes motion to capture the user's attention, while simultaneously keeping the end states familiar. Dividing the actions into two groups, those useful before an action and after is a standard approach, but swapping them in this manner is not. Unlike other systems that simply replace the actions, users of the data tables described herein may need access to mass actions ahead of time since they may function just fine without a selection.

1. The exposed actions slide to the right, behind the overflow button
2. The exposed actions cross fade to the new set of actions and the menu contents switch.
3. Actions slide back to the left. An example of actions is indicated by FIG. 13A, which illustrates a menu of the display table of FIG. 13B.

Referring now to FIG. 13B, a display table is shown in a first state before swap in an example are indicated. FIG. 13C shows the same display table in a second different state actions after the swap in an example are indicated.

EXAMPLES

Example 1 is a database system, comprising: a processing system; and a memory device coupled to the processing system and including instructions stored thereon that, in response to execution by the processing system, are operable to: download an application configured to generate a data table based on a data store including a plurality of records, wherein the data table includes: a plurality of rows, wherein each row corresponds to at least one record of the plurality of records; and each row including a plurality of cells, each cell corresponding to a different grouping of data fields of its respective one(s) of the records; wherein at least one cell of the data table comprises an editable concatenated cell that includes values of more than one data field of a record of the records; receive a user input from the application; determine whether to feedback at least one user input to a displayed cell of the data table to a corresponding data field of a corresponding record of the data store; and update the data store based on a result of the determination.

Example 2 includes the database system of example 1 or any other example herein, wherein the data store comprises a tenant database.

Example 3 includes the database system of any of examples 1-2 or any other example herein, wherein the data table includes a subset of records that correspond to a same tenant.

Example 4 includes the database system of any of examples 1-3 or any other example herein, wherein the determination includes: correlating a value of the at least one input to a plurality of first validation rules, wherein the first validation rules correspond to a respective tenant of the tenants, based on correspondence of the value to a data field of the data fields; and applying any correlated one(s) of the plurality of first validation rules to the value; and wherein the data store is updated based on a result of the application.

Example 5 includes the database system of any of examples 1-4 or any other example herein, wherein the determination includes: correlating the value of the at least one input to a plurality of second rules based on correspondence of the value to the data field of the data fields; and applying any correlated one(s) of the plurality of second rules to the value; wherein the data store is updated based on a result of the application.

Example 6 includes the database system of any of examples 1-5 or any other example herein, wherein a cell of the table includes a first user control to selected said cell.

Example 7 includes the database system of any of examples 1-6 or any other example herein, wherein a cell of the table includes a second user control to edit values of the cell.

Example 8 includes the database system of any of examples 1-7 or any other example herein, wherein the cell includes text of the values and a graphical user interface, wherein the first user control is activated by selecting (e.g., clicking) the text and the second user control is activated by selecting (e.g., clicking) the graphical user interface.

Example 9 includes the database system of any of examples 1-8 or any other example herein, wherein the application is configured to: in response to receiving a user selection of a navigation from a highlighted one of the first and second user controls of said cell to another cell, highlighting a corresponding one of first or second user controls of said another cell.

Example 10 includes the database system of any of examples 1-9 or any other example herein, wherein the application is configured to cause a first plurality of user controls to be displayed, and wherein the application is configured to: cause a second user control that is different than the first plurality of user controls to be displayed on a selected cell of the data table in response to receipt of a user input (e.g., a click or tab input) corresponding to the selected cell.

Example 11 includes the database system of any of examples 1-10 or any other example herein, wherein the second user control comprises a popover includes text, wherein the text of the popover is dynamically generated based on a value of the cell.

Example 12 includes the database system of any of examples 1-11 or any other example herein, wherein the application is further configured to: determine a selection of a row of the data table; and responsive to the selection, perform at least one of displaying a portion of cell borders of the selected row differently than a portion of cell borders of unselected cells, displaying a background of the selected row differently than a background of an unselected cell; wherein the portion of the cell borders comprises horizontal cell boundaries.

Example 13 includes the database system of any of examples 1-12 or any other example herein, wherein the application is further configured to: determine a selection of a cell of the selected row; and display a background of the selected cell differently than the background of the other cells of the selected row.

Example 14 includes the database system of any of examples 1-13, wherein a characteristic of the background of the selected cell includes at least one of negative highlighting or matches a background of an unselected row.

Example 15 includes the database system of any of examples 1-14, wherein states for each cell of the data table are selected from the group including grid focused and unfocused, row cell and target hover states, active highlight, cell and target focus, row selected, cell edited, cell errored, and locked cell.

Example 16 includes the electronic device of any of examples 1-15, wherein the application is further configured to: determine whether to focus is in the data table; in response to determining that focus is in the data table, display the selected cell with at least one of a first border or a first background; in response to determining that the focus is not in the data table, display the selected cell with at least one of a second different border or a second different background.

Example 17 includes the database system of any of examples 1-16, wherein the application is further configured to display the unselected cells with the first background, and wherein the second different border is has visibility only along row boundaries.

Example 18 includes the database system of any of examples 1-17, wherein the data table is a web data table and when the focus is not in the data table a user interface of the user system is to control the browser.

Example 19 includes the database system of any of examples 1-18, wherein the processing system may be further operable to: if an error is identified based on the application of the correlated one(s) of the plurality of first validation rules to the value, identify a first level error; if an error is identified based on the application of the correlated one(s) of the plurality of second rules to the value, identify a second level error; and causing error messaging to be displayed on the data table, wherein error messaging for a second level error is displayed on a data table overlay (e.g., a footer) and the first level error is displayed in the data table on a row that corresponds to the value.

Example 20 includes the database system of any of examples 1-19, wherein the error messaging for the first level error includes at least one of a row level error message, a cell level error message, or a field level error message.

Example 21 includes the database system of any of examples 1-20, wherein the popover includes at least one of top two corners squared off and aligned to a top of the row of the selected cell, a top left or top right corner aligned to the top left or right corner of the selected cell, or a lower edge and opposing side extendable beyond the table cell boundaries with at least one of a dropshadow or lower rounded corners.

Example 22 includes the database system of any of examples 1-21, wherein the cells are resizable in the row direction by displaying a label displayed in a cell to be resized.

Example 23 includes the database system of any of examples 1-22, wherein a selected value for the label determines a width of the label.

Example 24 includes the database system of any of examples 1-23, wherein the application is further configured to: display a graphical user interface for first actions concurrently with the data table; identify a user selection of a row of the data table; in response to the user selection of the row, identify a second set of actions based on the user selection of the row; and display a graphical user interface for the second set of actions responsive to the user selection of the row.

Example 25 includes the database system of any of examples 1-24, wherein the graphical user interface for the first actions is displayed in a first position relative to the data table, and the application is further configured to: display an action swap animation to display the graphical user interface of the first actions in a second different location relative to the data table and to display the graphical user interface for the second set of actions in the first position.

Example 26 is an apparatus comprising means to perform one or more elements of a method described in or related to any of examples 1-25, or any other method or process described herein.

Example 27 includes one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, and/or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-25, or portions thereof.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system, comprising:
a processing system; and
a memory device coupled to the processing system and including instructions stored thereon that, in response to execution by the processing system, perform operations comprising:
downloading to a remote user terminal an application configured to generate a data table from records stored in a data store, wherein the data table includes:
a plurality of rows, wherein each row corresponds to at least one record of the records; and
each row including a plurality of cells, each cell corresponding to a different grouping of data fields of its respective one(s) of the records;
wherein at least one of the plurality of cells comprises an editable concatenated cell that is driven by more than one data field of a record of the records;
wherein each individual cell of the plurality of cells of the data table includes a plurality of user controls, wherein a first user control of the plurality of user controls is arranged to toggle focus from the data table to the respective individual cell, and a second user control of the plurality of user controls is arranged to trigger display of a popover on the data table at the respective individual cell for editing corresponding record(s) of the records, wherein each second user control corresponds to a portion of an area of the respective individual cell, and wherein each first user control comprises a remaining portion of the area of the respective individual cell;
in the case that a communication is received from the application on the remote user terminal to edit the editable concatenated cell, correlating a value from the communication to an individual data field of the more than one data field of the record and selectively feeding back a value of the communication to the correlated individual data field.

2. The database system of claim 1, wherein the data store comprises a multi-tenant database.

3. The database system of claim 2, wherein the data table includes a subset of records that correspond to a same tenant.

4. The database system of claim 3, wherein operations further comprise:
correlating the value of the communication to first validation rules based on the correlating the value to the individual data field, wherein the first validation rules correspond to a respective tenant of the tenants; and
applying any correlated one(s) of the first validation rules to the value of the communication, wherein the selectively feeding back the value of the communication to the individual data field is based on the correlated one(s) of the first validation rules.

5. The database system of claim 4, wherein the first validation rules are tenant-specific and the operations further comprise:
correlating the value of the communication to second global validation rules based on the correlating the value to the individual data field; and
applying any correlated one(s) of the second global validation rules to the value of the communication, wherein the selectively feeding back the value of the communication to the individual data field is based on the correlated one(s) of the first tenant-specific validation rules and the second global validation rules.

6. The database system of claim 1, wherein each second user control comprises text, wherein each second user control is based on a field value of a respective one of the groupings of data fields.

7. The database system of claim 1, wherein each second user control is arranged to trigger the display of the respective popover on user selection of the respective text, wherein the first user control is arranged to toggle focus to the respective individual cell on user selection of the remaining portion of the area.

8. The database system of claim 1, wherein the popover of the editable concatenated cell includes at least one of top two corners squared off and aligned to a top of the row of the editable concatenated cell, a top left or top right corner aligned to the top left or right corner of the selected cell, or a lower edge and opposing side extendable beyond the table cell boundaries with at least one of a dropshadow or lower rounded corners.

9. The database system of claim 1, wherein the operations further comprise first operations, and wherein the application is configured to, in response to execution by a processing system of the user terminal, perform second operations comprising:
identifying a selection of a row of the data table; and
responsive to the selection, performing at least one of display a portion of cell borders of the selected row differently than a portion of cell borders of unselected ones of the individual cells or display a background of the selected row differently than a background of the unselected ones of the individual cells;
wherein the portion of the cell borders comprises horizontal cell boundaries.

10. The database system of claim 9, wherein the second operations further comprise:
determining a selection of one of the individual cells; and
displaying a background of the selected individual cell differently than the background of the other individual cells of the selected row on a screen of the user terminal.

11. The database system of claim 10, wherein a characteristic of the background of the selected individual cell includes at least one of negative highlighting or matches a background of an unselected row.

12. A database system, comprising:
a processing system; and
a memory device coupled to the processing system and including instructions stored thereon that, in response to execution by the processing system, are operable to:

download to a user system an application configured to generate a data table from records stored in a data store, wherein the data table includes:
  a plurality of rows, wherein each row corresponds to at least one record of the records; and
  each row including a plurality of cells, each cell corresponding to a different grouping of data fields of its respective one(s) of the records;
  wherein at least one cell of the data table comprises an editable concatenated cell that includes values of more than one data field of a record of the records;
  wherein each individual cell of the plurality of cells of the data table includes a plurality of user controls, wherein a first user control of the plurality of user controls is arranged to toggle focus from the data table to the respective individual cell, and a second user control of the plurality of user controls is arranged to trigger display of a popover on the data table at the respective individual cell for editing corresponding record(s) of the records;
receive a communication from the application, the communication corresponding to at least one user input to one of the individual cells;
determine whether to feedback a value of the at least one user input to the individual cell to a corresponding data field of a corresponding record of the data store; and
update the corresponding record in the data store based on a result of the determination;
wherein states for each of the individual cells are selectable from a group including:
  active cell with focus in the data table, and
  active cell without focus in the data table, and
wherein the application is configured to use:
  a first display style for a corresponding individual cell when the corresponding individual cell is in the active state and a user interface of the user system is currently controlling the data table, and
  a second display style that is different than the first display style when the corresponding individual cell is in the active state and the user interface is currently controlling a navigation control that is outside of the data table.

13. The database system of claim 1, wherein the operations comprise first operations and the application is configured to, in response to execution by a processing system of the user terminal, perform second operations comprising:
  determining whether focus is in the data table;
  in response to determining that focus is in the data table, displaying a selected one of the individual cells with at least one of a first border or a first background;
  in response to determining that the focus is not in the data table, displaying the selected individual cell with at least one of a second different border or a second different background.

14. The database system of claim 13, wherein the second operations further comprise displaying unselected ones of the individual cells with the first background, and wherein the second different border has visibility only along row boundaries.

15. The database system of claim 14, wherein the data table is a web data table in a browser and when focus is not in the data table a user interface of the user system is to control the browser.

16. The database system of claim 1, wherein the operations further comprise:
  identifying a first level error if an error is identified based on applying first validation rules to the value of the communication;
  identifying a second level error if an error is identified based on applying second different validation rules to the value of the communication; and
  displaying error messaging on the data table, wherein error messaging for any identified second level error(s) is displayed on a data table overlay and error messaging for any identified first level error(s) is displayed in the data table on a row that corresponds to the value.

17. The database system of claim 16, wherein the error messaging for the first level error includes at least one of a row level error message, a cell level error message, or a field level error message.

18. The database system of claim 1, wherein the individual cells are resizable in a row direction by displaying a label displayed in each individual cell, wherein a selected value for the label determines a width of the label.

19. The database system of claim 1, wherein the operations comprise first operations and the application is configured to, in response to execution by a processing system of the user terminal, perform second operations comprising:
  displaying a graphical user interface for first set of actions concurrently with the data table;
  identifying a user selection of a row of the data table;
  in response to the user selection of the row, identifying a second set of actions based on the user selection of the row; and
  displaying a graphical user interface for the second set of actions responsive to the user selection of the row.

20. The database system of claim 19, wherein the graphical user interface for the first actions is displayed in a first position relative to the data table, and the second operations further comprise:
  displaying an action swap animation to display the graphical user interface of the first actions in a second different location relative to the data table and to display the graphical user interface for the second set of actions in the first position.

21. A database system, comprising:
  a processing system; and
  a memory device coupled to the processing system and including instructions stored thereon that, in response to execution by the processing system, are operable to:
  download to a user system an application configured to generate a data table from records stored in a data store, wherein the data table includes:
    a plurality of rows, wherein each row corresponds to at least one record of the records; and
    each row including a plurality of cells, each cell corresponding to a different grouping of data fields of its respective one(s) of the records;
  wherein at least one cell of the data table comprises an editable concatenated cell that includes values of more than one data field of a record of the records;
  wherein each individual cell of the plurality of cells of the data table includes a plurality of user controls, wherein a first user control of the plurality of user controls is arranged to toggle focus from the data table to the respective individual cell, and a second user control of the plurality of user controls is arranged to trigger display of a popover on the data table at the respective individual cell for editing corresponding record(s) of the records;

receive a communication from the application, the communication corresponding to at least one user input to one of the individual cells;

determine whether to feedback a value of the at least one user input to the individual cell of the data table to a corresponding data field of a corresponding record of the data store; and update the corresponding record in the data store based on a result of the determination;

wherein the application is executable by a browser and the data table is a web data table, and wherein states for each of the individual cells are selectable from a group including inactive cell, active cell with focus in the web data table, and active cell without focus in the web data table, wherein the application is configured to use a first display style for a corresponding individual cell when the corresponding individual cell is in the inactive cell state, a second display style that is different than the first display style when the corresponding individual cell is in the active state and a user interface of the user system is currently controlling the web data table, and a third display style that is different than the second display style when the corresponding individual cell is in the active state and the user interface is currently controlling a navigation control or other browser control outside of the web data table.

* * * * *